Figure 1:
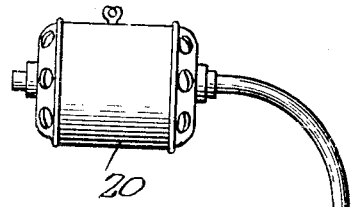

J. SCHUTZ.
POWER OPERATED SHEARS.
APPLICATION FILED JULY 26, 1916.

1,228,838.

Patented June 5, 1917.

Witness.
A. E. Bartlett

Inventor
John Schutz,
By Charles O. Shervey
Atty.

UNITED STATES PATENT OFFICE.

JOHN SCHUTZ, OF CHICAGO, ILLINOIS, ASSIGNOR OF ONE-HALF TO JACOB BENOVY, OF CHICAGO, ILLINOIS.

POWER-OPERATED SHEARS.

1,228,838.  Specification of Letters Patent.  Patented June 5, 1917.

Application filed July 26, 1916. Serial No. 111,360.

*To all whom it may concern:*

Be it known that I, JOHN SCHUTZ, a citizen of the United States, and a resident of Chicago, county of Cook, and State of Illinois, have invented certain new and useful Improvements in Power-Operated Shears, of which the following is declared to be a full, clear, and exact description.

This invention relates to shears, and its primary object is to provide shears, the blades of which are operated by power. The task of using hand shears for cutting cloth and other woven fabric is an irksome and laborious undertaking, particularly where the operator's business is to cut cloth or fabric during the entire day, this work frequently causing blisters upon the hand, much to the discomfort of the operator. The purpose of this invention is to provide shears or scissors which may be grasped by the operator by means of a handle and the blades themselves actuated by a power driven shaft. The invention further consists in shears of this type having means for coupling the shear blades with the power driven shaft or uncoupling them therefrom at will. With these and other objects in view, this invention consists in the several novel features of construction, arrangement and combination of parts hereinafter fully set forth and claimed.

The invention is clearly illustrated in the drawing accompanying this specification, in which:—

Figure 5:
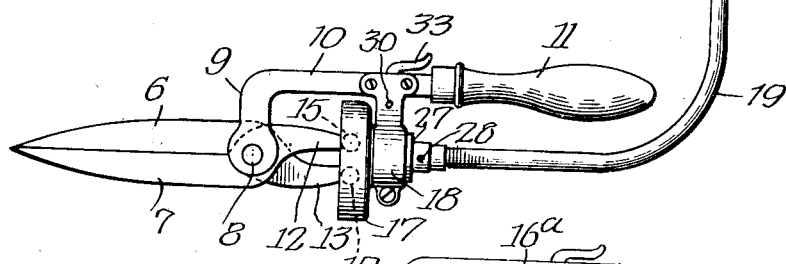
Figure 5:
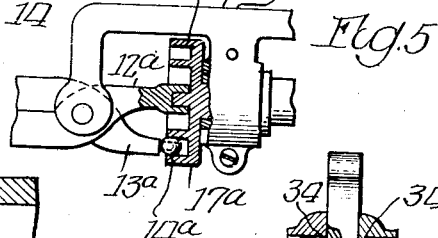
Figure 2:
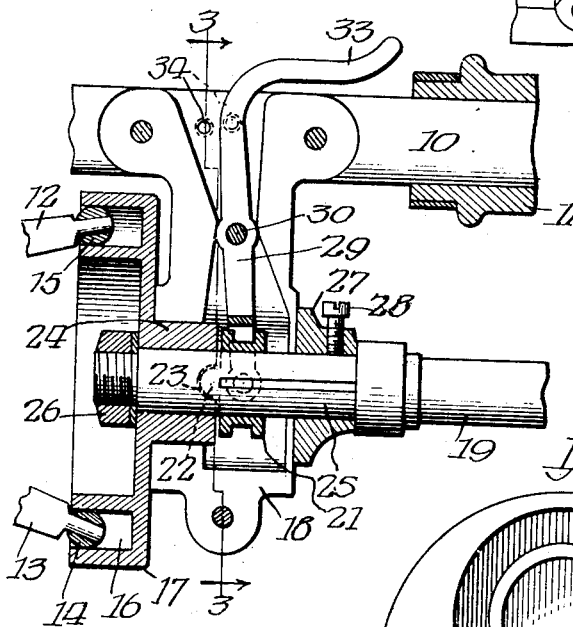
Figure 3:
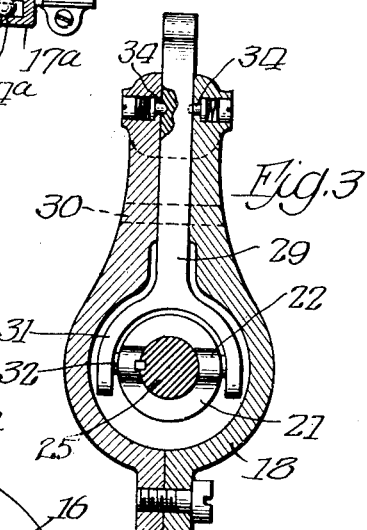
Figure 4:
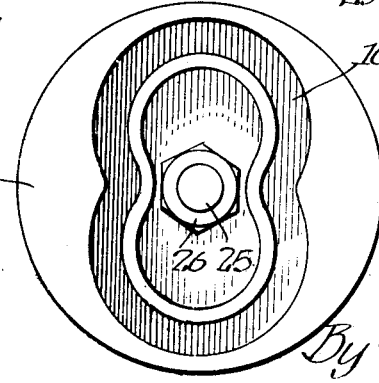

Figure 1, is a side elevation of a pair of power driven shears embodying a simple form of the present invention; Fig. 2, is a fragmental, longitudinal section of the shears; Fig. 3, is a detail cross-section taken on the line 3—3 of Fig. 2; Fig. 4, is a face view of a certain cam block forming part of the invention, and Fig. 5, is a fragmental side elevation partly broken away of a modified form of the invention.

Referring to said drawing, and first to Figs. 1 to 4, inclusive, the reference numerals 6, 7, designate the two blades of a pair of shears embodying a simple form of the present invention, said blades being pivoted together upon a pin 8, mounted in the forked end 9, of a transportable support 10; said support 10, may be in the form of an arm having at its rear end a handle 11, by means of which the shears may be handled.

The shanks 12, 13, of the shear blades are provided upon their ends with balls or other anti-friction rollers 14, 15, which travel in a cam groove 16, formed in the face of a cam block 17. The shape of the cam groove 16, is best seen in Fig. 4, where it will be seen to extend in reverse curved lines running from the outer edge toward the center of the cam block, whereby when said cam block is rotated, the balls 14, 15, and therewith the shanks and blades of the shears will be moved toward and away from each other so as to affect the usual cutting action of the blades.

The cam block 17, has a hub or hollow trunnion 24, journaled in a bracket 18, which extends down from the support 10, and said cam block is arranged to be coupled to or uncoupled from a flexible shaft 19, that runs to a suitable source of power, here shown as comprising a small electric motor 20, which may be supported from the ceiling or any other accessible portion of the room in which the shears are employed. Any suitable form of clutch mechanism between the cam block 17, and flexible shaft 19, may be employed, and the one here shown, may conveniently comprise a clutch collar 21, having one or more teeth or projections 22, adapted to enter one or more notches 23, formed in the end face of the hub 24, of the cam block. The clutch collar 21, is slidably mounted on and keyed to a short shaft 25, which is secured to the end of the flexible shaft 19, and projects through a central hole in the hub 24. The cam block 17, is held in place upon said shaft 25, and bracket 18, by a nut 26, threaded upon its reduced end as clearly indicated in Fig. 2, and a sleeve 27, is secured upon the other end of said short shaft 25, by a set screw 28, bearing against the shaft 25, and said sleeve 27, bears against the other side of the bracket 18, to prevent endwise movement of said shaft 25, in one direction with respect thereto. A clutch operating lever 29, extends through a hollow portion of the bracket 18, and is fulcrumed upon a pin 30, secured in the bracket. Said lever 29, has the usual fork 31, upon its lower end, which fork is provided with pins 32, that extend into a circumferential groove formed upon the clutch collar 21. Said lever extends up through the support 10, and has a finger piece 33, that may be engaged by the thumb or fingers of the user to shift the clutch collar 21, into or out of engagement with the hub of the cam block. Conveniently spring pressed pins 34, secured in the support 10, may engage depressions formed in the sides of the lever 33, to hold said lever in the positions where it clutches or unclutches the clutch collar 21, from the hub of the cam block.

In the operation of this device, the current to the motor 20, is turned on and the flexible shaft 19, is thereby rotated. The shears are then grasped by the handle 11, and the lever 33, moved in the proper direction to clutch the clutch collar with the hub of the cam block, whereby its rotation is affected through the instrumentality of the flexible shaft. The shears may now be used in cutting cloth or other fabric and may be held in either a vertical plane, a horizontal plane, or in any desired position as is customary in handling the ordinary hand shears. To stop the cutting action of the blades, the lever 33, is moved in the direction to unclutch the short shaft from the cam block.

In the modified form shown in Fig. 5, one of the shanks 12ª, of the blades, is stationarily secured to the cam block 17ª, at its axes of rotation, and the other shank 13ª, is provided with a ball or other anti-friction roller 14ª, which runs in the cam groove 16ª, of the cam block 17ª. In other respects, the construction of shears of said modified form is substantially the same as that of the shears in the preferred form. This modified form of shears has the one advantage that the lower blade of the shears does not move up and down in the cutting action, but the upper blade is the only one that moves. This may be found particularly advantageous where it is desired to cut cloth lying along the table or bench, since the lower blade may run along the table or bench.

It is perfectly obvious that shears made in accordance with the invention as set forth above, saves a great deal of time and labor and reduces the irksome task of trimming, or cutting cloth or other material to a minimum. The shears may be used any length of time without materially tiring the workman. The device is simple in construction, easy to manipulate and may be operated from any suitable source of power having a rotating element.

More or less variation of the exact details of construction shown and described may be made without departing from the spirit of this invention, and I desire, therefore, not to limit myself to the particular forms described, but intend in the following claims to point out all of the invention disclosed herein.

I claim as new and desire to secure by Letters Patent:

1. Shears, comprising a transportable support, two cutting blades pivoted together upon said support, and each having a cam engaging shank, a cam block rotating in a plane transverse to the plane of the blades and having a continuous cam groove formed therein, said shanks traveling in said groove and a rotatory cam driving shaft carried by said support.

2. Shears, comprising a transportable support, two cutting blades pivoted together upon said support, each blade having a cam engaging shank, a rotatory cam block, rotating in a plane transverse to the plane of the blades and having a continuous cam groove formed therein, in which the shanks travel, a rotatory shaft carried by said support, and a clutch between said cam block and shaft.

3. Shears, comprising a transportable support, two cutting blades, pivoted together upon said support, each blade having a cam engaging shank, a rotatory cam block journaled on said support and rotating in a plane transverse to the plane of the blades and having a continuous cam groove formed therein, in which said shanks travel, a flexible rotatory driving shaft, and clutch mechanism between said cam block and shaft.

4. Shears, comprising a transportable support having a handle thereon, two cutting shear blades pivoted together upon said support, each having a cam engaging shank, an anti-friction ball mounted on the end of each shank, a rotatory cam block journaled on said support and coöperating with said shanks to actuate the blades, said cam block rotating in a plane transverse to the plane of the blades, a flexible driven shaft and clutch mechanism between said cam block and shaft.

5. Shears, comprising a transportable support having a handle thereon, two blades pivoted together and carried by said support, each formed with a shank, a cam block journaled on said support and rotating in a plane transverse to the plane of the blades, said cam block having a continuous cam groove, at least one of said shanks traveling in said cam groove, a driven flexible shaft, a short shaft secured thereto, and clutch mechanism carried by said support for clutching and unclutching said cam block from said short shaft.

JOHN SCHUTZ.